(12) United States Patent
Hallek et al.

(10) Patent No.: US 10,627,498 B2
(45) Date of Patent: Apr. 21, 2020

(54) ULTRASONIC SENSOR ARRANGEMENT FOR A MOTOR VEHICLE, MOTOR VEHICLE AND METHOD FOR INSTALLING AN ULTRASONIC SENSOR

(71) Applicant: VALEO Schalter und Sensoren GmbH, Bietigheim-Bissingen (DE)

(72) Inventors: Michael Hallek, Bietigheim-Bissingen (DE); Uwe Kupfernagel, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 886 days.

(21) Appl. No.: 15/086,306

(22) Filed: Mar. 31, 2016

(65) Prior Publication Data
US 2016/0297372 A1    Oct. 13, 2016

(30) Foreign Application Priority Data
Apr. 13, 2015   (DE) .................. 10 2015 105 556

(51) Int. Cl.
| | |
|---|---|
| *B60R 11/00* | (2006.01) |
| *G01S 7/521* | (2006.01) |
| *G01S 15/931* | (2020.01) |

(52) U.S. Cl.
CPC ............ *G01S 7/521* (2013.01); *G01S 15/931* (2013.01); *G01S 2015/937* (2013.01); *G01S 2015/939* (2013.01)

(58) Field of Classification Search
CPC ....... B60R 11/00; G01S 15/931; G01S 7/521; G01S 2015/937; G01S 2015/939
See application file for complete search history.

(56) References Cited

U.S. PATENT DOCUMENTS

| | | | | |
|---|---|---|---|---|
| 3,158,835 A | * | 11/1964 | Hipkins | .................... H04R 5/02 |
| | | | | 340/384.73 |
| 4,695,985 A | * | 9/1987 | Takeoka | ............... G10K 11/002 |
| | | | | 367/140 |

(Continued)

FOREIGN PATENT DOCUMENTS

| | | |
|---|---|---|
| DE | 102006004874 A1 | 8/2007 |
| DE | 10 2008 007 042 A1 | 8/2008 |

(Continued)

OTHER PUBLICATIONS

Search Report issued in corresponding German Patent Application No. 10 2015 105 556.2, dated Jan. 8, 2016 (12 pages).

*Primary Examiner* — Hovhannes Baghdasaryan
*Assistant Examiner* — Amie M N'Dure
(74) *Attorney, Agent, or Firm* — Osha Liang LLP

(57) ABSTRACT

The invention relates to an ultrasonic sensor arrangement (8) for a motor vehicle (14), with a panel part (9) of the motor vehicle (14) and an ultrasonic sensor (2) which has a front side (3) and is designed for transmitting and/or receiving ultrasonic signals via the front side (3), wherein the ultrasonic sensor (2) is arranged within a continuous recess (10) in the panel part (9) and the recess (10) is covered by a covering (11) which does not impair the transmission and/or reception of the ultrasonic signals, wherein the panel part (9) has a material (M) and/or a material thickness (d2), by means of which the transmission and/or the reception of the ultrasonic signals is blocked at least in a region of the panel part (9) surrounding the recess (10). The invention also relates to a motor vehicle (14) and to a method for installing an ultrasonic sensor (2) in a panel part (9) of a motor vehicle (14).

10 Claims, 4 Drawing Sheets

(56) References Cited

U.S. PATENT DOCUMENTS

Figure 1:
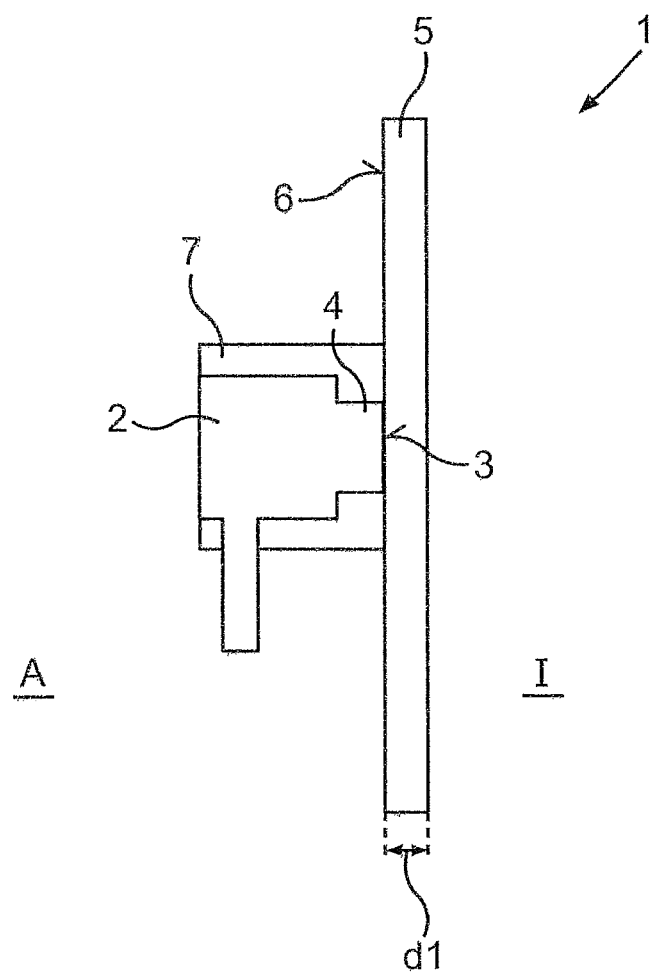

| | | | | | |
|---|---|---|---|---|---|
| 4,754,440 | A | * | 6/1988 | Naruse | B06B 1/0666 |
| | | | | | 181/148 |
| 5,629,690 | A | * | 5/1997 | Knoll | B60R 19/483 |
| | | | | | 340/435 |
| 6,094,402 | A | * | 7/2000 | Cooper | G10K 9/22 |
| | | | | | 367/173 |
| 8,276,445 | B2 | * | 10/2012 | Reiche | G10K 9/122 |
| | | | | | 73/430 |
| 2002/0158582 | A1 | * | 10/2002 | Fayt | B60R 19/445 |
| | | | | | 315/77 |
| 2015/0177378 | A1 | * | 6/2015 | Rostocki | G01S 15/931 |
| | | | | | 293/117 |

FOREIGN PATENT DOCUMENTS

| | | | | |
|---|---|---|---|---|
| DE | 10 2010 044 996 A1 | | 3/2012 | |
| DE | 102010044997 A1 | | 3/2012 | |
| DE | 102010044998 A1 | | 3/2012 | |
| DE | 102010049820 A1 | | 5/2012 | |
| DE | 102014111098 A1 | * | 2/2016 | ............ G01S 7/521 |
| EP | 2650055 A2 | * | 10/2013 | ........... B06B 1/0607 |
| WO | WO-2014016295 A1 | * | 1/2014 | ........... G01S 15/931 |

* cited by examiner

ULTRASONIC SENSOR ARRANGEMENT FOR A MOTOR VEHICLE, MOTOR VEHICLE AND METHOD FOR INSTALLING AN ULTRASONIC SENSOR

The invention relates to an ultrasonic sensor arrangement for a motor vehicle, with a panel part of the motor vehicle and an ultrasonic sensor which has a front side and is designed for transmitting and/or receiving ultrasonic signals via the front side, wherein the ultrasonic sensor is arranged within a continuous recess in the panel part and the recess is covered by a covering which does not impair the transmission and/or reception of the ultrasonic signals. The invention also relates to a motor vehicle and to a method for integrating an ultrasonic sensor in a panel part.

It is already known from the prior art to arrange ultrasonic sensors on motor vehicles, for example on a bumper of the motor vehicle, in order to monitor a region surrounding the motor vehicle. This is described, for example, in DE 10 2010 044 907 A1 and DE 10 2010 044 998 A1. The object information, which is detected by the ultrasonic sensor, in the region surrounding the motor vehicle can be provided to a driver assistance system, for example a parking assistance system.

In addition, for example, DE 10 2006 004 874 A1 shows an ultrasonic sensor and a sensor covering in the form of a film, wherein the ultrasonic sensor can be accommodated by a clearance or bore in an outer part of a vehicle, and wherein the ultrasonic sensor can be outwardly covered by the sensor covering. In order to configure the sensor covering to be as inconspicuous as possible visually, the sensor covering is chrome coloured, DE 10 2010 049 820 A1 also describes an ultrasonic sensor arrangement with an outer panel element for a motor vehicle and at least one sensor which is positioned on the outer panel element. The sensor is arranged in the region of a recess of the outer panel element and is covered there by a covering which constitutes sight protection for the sensor.

When ultrasonic sensors are arranged on a panel part, it is therefore the primary goal, according to the prior art, to arrange the ultrasonic sensors as inconspicuously and visually imperceptibly as possible in the panel part. However, restrictions may arise here with regard to possible fitting sites of the ultrasonic sensor.

It is the object of the present invention to provide an ultrasonic sensor arrangement which can be attached in a particularly flexible manner to a motor vehicle.

This object is achieved according to the invention by an ultrasonic sensor arrangement, a motor vehicle and a method with the features according to the independent patent claims.

An ultrasonic sensor arrangement according to the invention for a motor vehicle comprises a panel part of the motor vehicle and an ultrasonic sensor. The ultrasonic sensor has a front side and is designed for transmitting and/or receiving ultrasonic signals via the front side. The ultrasonic sensor is arranged within a continuous recess in the panel part. The recess is covered by a covering which does not impair the transmission and/or reception of the ultrasonic signals. Furthermore, the panel part has a material and/or a material thickness, by means of which the transmission and/or the reception of the ultrasonic signals is blocked at least at a region of the panel part surrounding the recess.

The ultrasonic sensor is arranged here in the continuous recess, for example a bore, in the panel part. The panel part here can be, for example, an outer panel part, wherein an outer panel part should be understood as meaning any outer part of the motor vehicle which faces the external region of the motor vehicle and delimits the motor vehicle towards the outside. The ultrasonic sensor arranged in the outer panel part may serve here, for example, for detecting objects in the exterior region of the motor vehicle or for monitoring the exterior region. However, the panel part may also be an inner panel part of the motor vehicle, wherein an inner panel part should be understood as meaning an inner part of the motor vehicle facing an interior or a passenger compartment of the motor vehicle. The ultrasonic sensor arranged in the inner panel part may serve here, for example, for monitoring the interior, in particular for detecting people in the passenger compartment of the motor vehicle.

The ultrasonic sensor is covered here by a covering which does not impair the detection function of the ultrasonic sensor. The transmission and/or reception of ultrasonic signals is therefore only insignificantly impaired, if at all, in respect of the signal strength by the covering. In other words, the functionality of the ultrasonic sensor is maintained in substantially unchanged form despite the covering, and therefore the ultrasonic sensor in particular continues to be suitable for supplying meaningful information. The material of the covering can be optimally coordinated here with the ultrasonic sensor and can be, for example, plastic, aluminium or a metal with different material strengths which do not impair the sensor function. The covering here is preferably configured as a metallic lamina with a thickness of at most 1 millimetre.

In contrast thereto, the panel part is manufactured from a material or a material composition and/or a material thickness or a material strength which blocks the transmission and/or the reception of the ultrasonic signals at least in the region surrounding the recess. In other words, the transmission and/or the reception of the ultrasonic signals are/is possible through the covering only in the region of the recess. The material composition and/or the material thickness of the panel part prevent the transmission and/or reception either fundamentally or to the extent that, although the transmission and/or reception of the ultrasonic signal is possible through the panel part, a signal strength of the ultrasonic signal is weakened in such a manner that the information transmitted is unsuitable for use for, for example, a driver assistance system.

By means of the ultrasonic sensor arrangement, ultrasonic signals can therefore be transmitted and/or received although the ultrasonic sensor is actually integrated in a panel part which has an unsuitable material which is impermeable to ultrasonic signals; and/or material strength. The ultrasonic sensor arrangement is therefore configured in a particularly flexible manner since virtually any panel part is suitable for the motor vehicle ultrasonic sensor arrangement according to the invention. In other words, a locally more diverse or locally more flexible installation of an ultrasonic sensor can be realized by means of the ultrasonic sensor arrangement.

The panel part particularly preferably has real glass as the material. The panel part can therefore be configured here in particular as a window, for example a rear window, of the motor vehicle. The ultrasonic sensor which, for example, is integrated in the rear window and faces the surrounding region, may detect, for example, a distance of objects in the region surrounding the motor vehicle from the rear window. As a result, a motor vehicle tailgate having the rear window can be protected, for example, against collision with the object. The ultrasonic sensor which, for example, is integrated in a side window and faces the interior can be used for detecting people in the passenger compartment.

Provision may also be made for the panel part to have a plastic as the material. The panel part can therefore be configured here in particular as a spoiler of the motor vehicle, for example as a roof spoiler or a rear spoiler. Spoilers are generally rigid components which, furthermore, have a greet material thickness or material strength. The ultrasonic sensor can also be integrated in an advantageous manner in said rigid components without its detection function being impaired.

According to an embodiment, the panel part has wood as the material. The panel part can be configured, for example, as a wooden decorative strip on the motor vehicle or in the motor vehicle, for example in a dashboard in the interior of the motor vehicle, in which the sensor can be arranged within the continuous recess of the panel part.

The panel part preferably has a metallic material of the material. The panel part can therefore be a vehicle body part, for example a vehicle pillar or a roof panel of the motor vehicle, here. In particular, the metallic panel part has a thickness, by means of which the panel part is impermeable to ultrasound waves in the region outside the recess.

The panel part preferably has a material thickness of at least 4 millimetres. From such a material thickness, transmission and/or reception of the signal, in the case of an ultrasonic sensor arranged on a rear side of the panel part, is either completely prevented or a signal strength is weakened in such a manner that the information transmitted by the ultrasonic signal is unsuitable for a driver assistance system. However, even in such thick materials, by means of the recess, in which the ultrasonic sensor with the covering, which does not impair the transmission and/or reception, is arranged, detection of the surrounding region or of the interior and therefore provision of suitable information for the driver assistance system can take place.

It can be provided that a surface of the covering is larger than a surface of the front side of the ultrasonic sensor, wherein the covering is mechanically connected to the front side, and the covering in the connected state completely covers the front side of the ultrasonic sensor. Such a mechanical connection can be, for example, an adhesive, by means of which the covering is connected or adhesively bonded to the front side of the ultrasonic sensor. The ultrasonic sensor can therefore be arranged in the recess and can be removed from the recess together with the covering. The covering projects here over a lateral edge of the front side of the ultrasonic sensor, and therefore the surface of the covering completely covers the surface of the front side and protrudes laterally over the covering in regions. As a result, a front side of the ultrasonic sensor is particularly readily protected from environmental influences.

According to an advantageous embodiment of the invention, an inner wall of the recess has at least one step-shaped holding element for holding the covering, wherein, in order to cover the recess, a side edge region of a lower side of the covering rests on the at least one step-shaped holding element, and an upper side of the covering ends flush with an upper side of the panel part. Such a step-shaped holding element can be, for example, a supporting platform which runs along the inner wall of the, for example, cylindrical recess. The side edge region of the lower side of the covering rests on said step-shaped holding element. Said side edge region arises from the larger surface of the covering in comparison to the surface of the front side and constitutes the region which, after the covering is fastened on the front side, projects beyond the lateral edge of the front side. As soon as the side edge region rests on the holding element, the upper sides of the covering and of the panel part end flush.

The upper sides of the covering and of the panel part face the region surrounding the motor vehicle here. The ultrasonic sensor can be integrated in as inconspicuous a manner as possible visually by means of the flush end. In order to design the covering to be as inconspicuous as possible visually, said covering can be adapted in the shape thereof as designed. The covering can thus be shaped, for example, to be round, polygonal, square or diamond-shaped and can be matched to the respective panel part and to the material of the panel part. The surface shape of the generally round front side and of the covering can therefore differ.

In a development of the invention, a gap between the covering and an edge of the recess is filled with a sealing material, and therefore an upper side of the covering and an upper side of the panel part form a continuous surface. In other words, a transition between the covering and the panel part is designed to be scarcely perceivable, if at all, visually and haptically by the transition formed by the gap being filled with the sealing material or with a filling material. The sealing material also males it possible to prevent, for example, moisture or dirt from entering via the gap through the continuous recess into an interior of the motor vehicle. In the case of a panel part designed as a window, the provision of the sealing material is particularly advantageous.

In an embodiment of the invention, an overall upper side formed by upper sides of the covering and of the panel part is coated with a coat of paint. In other words, this means that the upper side of the covering and the upper side of the panel part are painted in the same colour. The effect can therefore be achieved that the ultrasonic sensor is not visually perceptible to an observer in the region surrounding the motor vehicle.

In the case of a panel part which is manufactured from real glass, preferably the region which surrounds the recess is tinted and the covering is painted in a colour of the tinting.

The ultrasonic sensor can therefore also be integrated particularly inconspicuously in a window of the motor vehicle.

A motor vehicle according to the invention comprises an ultrasonic sensor arrangement according to the invention. The motor vehicle is configured in particular as a passenger vehicle. The motor vehicle has in particular a driver assistance system, for example a parking assistance system, a dead angle assistance system or an automatic tailgate opener, to which the surroundings information detected by the ultrasonic sensor arrangement can be provided.

The invention also relates to a method for installing an ultrasonic sensor in a panel part of a motor vehicle, wherein the ultrasonic sensor transmits and/or receives ultrasonic signals via a front side and is arranged within a continuous recess in the panel part. The recess is covered by a covering which does not impair the transmission and/or reception of the ultrasonic signals. Furthermore, a material and/or a material thickness are/is provided for the panel part such that the transmission and/or reception of the ultrasonic signals is blocked at least in a region of the panel part surrounding the recess.

The preferred embodiments presented with respect to the ultrasonic sensor arrangement according to the invention and the advantages of said embodiments apply correspondingly to the motor vehicle according to the invention and to the method according to the invention.

Positions and orientations provided in the event of use as intended and arrangement as intended of the ultrasonic sensor arrangement on the vehicle and with an observer then standing in front of the motor vehicle and looking in the direction of the ultrasonic sensor arrangement are indicated by the details. "at the top", "at the bottom", "at the front", "at the rear", "horizontally", "vertically", "on the outside", "on the inside", etc.

Further features of the invention emerge from the claims, the figures and the description of the figures. The features and combinations of features mentioned above in the description and the features and combinations of features mentioned below in the description of the figures and/or shown solely in the figures can be used not only in the respectively stated combination, but also in different combinations or on their own without departing from the scope of the invention. Embodiments which are not explicitly shown and explained in the figures, but rather arise from, and can be produced by, combinations of features which are separate from the explained embodiments, should also be considered as included and disclosed by the invention, Embodiments and combinations of features which therefore do not have all of the features of en originally drafted, independent claim should also be considered to be disclosed.

Figure 2:
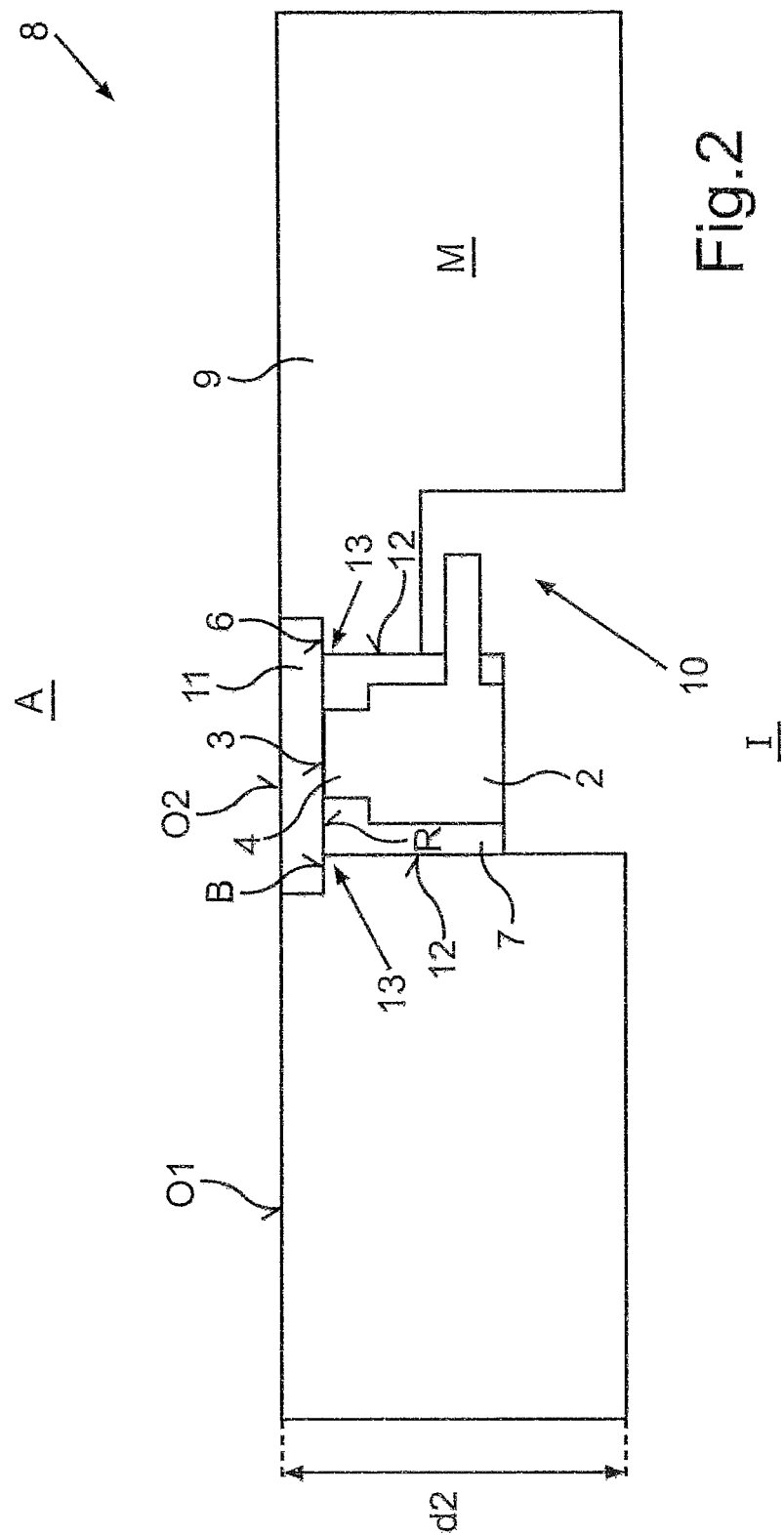
Figure 3A:
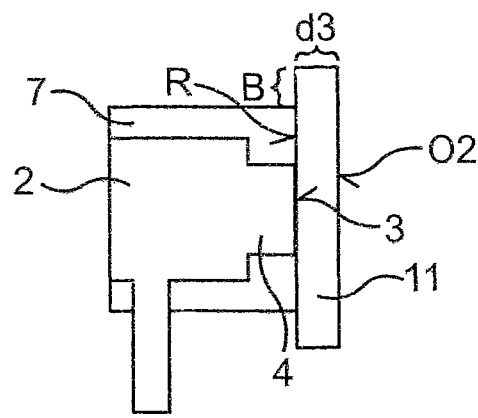
Figure 3B:
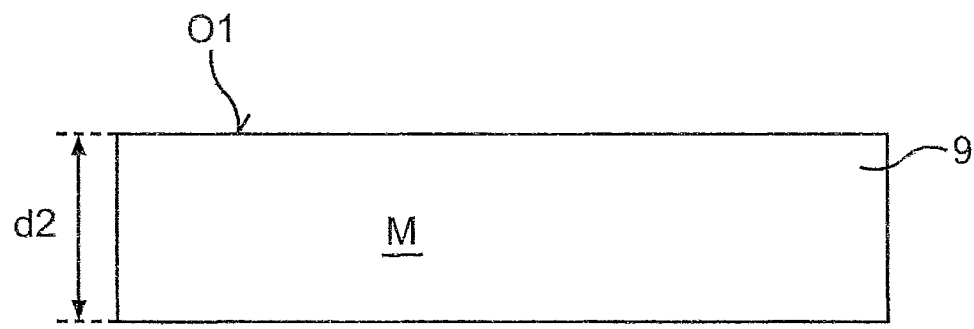
Figure 3C:
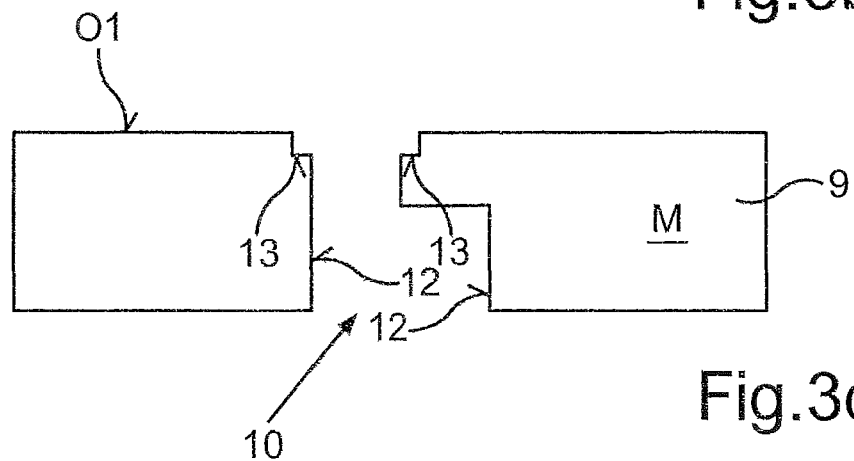
Figure 4:
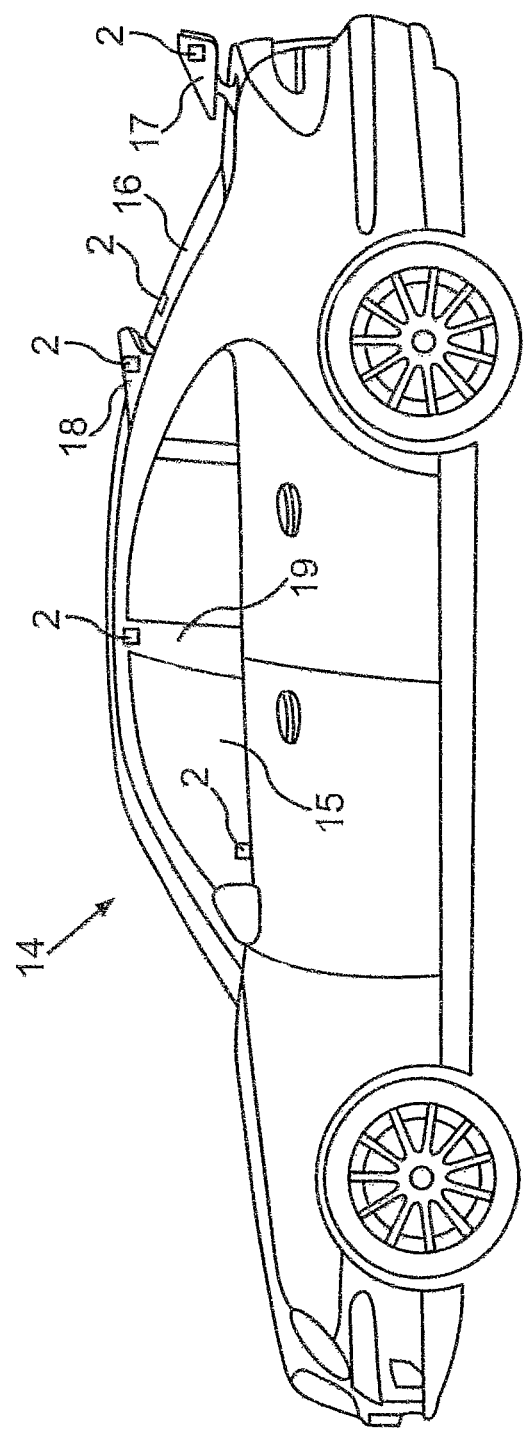

The invention is now explained in more detail below with reference to a preferred exemplary embodiment and with reference to the attached drawings, in which:

FIG. 1 shows an ultrasonic sensor arrangement with an ultrasonic sensor and a panel part according to the prior art, FIG. 2 shows a schematic illustration of an embodiment of an ultrasonic sensor arrangement according to the invention with an ultrasonic sensor and a panel part, FIGS. 3a-c show method steps for producing an embodiment of an ultrasonic sensor arrangement according to the invention, and FIG. 4 shows a schematic illustration of an embodiment of a motor vehicle according to the invention.

In the figures, identical or functionally identical elements are provided with the same reference signs.

FIG. 1 shows an ultrasonic sensor arrangement 1 according to the prior art for a motor vehicle, in a side view. The ultrasonic sensor arrangement 1 comprises an ultrasonic sensor 2 with a front side 3 for transmitting and/or receiving ultrasonic signals. The front side 3 can be, for example, the end surface of a cup-shaped oscillatory membrane 4 of the ultrasonic sensor 2. The ultrasonic sensor arrangement 1 also comprises a panel part 5, for example in the form of a bumper of the motor vehicle, to the rear side 6 of which the ultrasonic sensor 2 is fastened. The ultrasonic sensor 2 is therefore arranged on an inner side I facing away from an external region A of the motor vehicle and is therefore not visible when viewed from the external region A.

The ultrasonic sensor arrangement 1 has a holder 7 for accommodating the ultrasonic sensor 2, in which holder the ultrasonic sensor 2 can be fastened, for example can be latched. The ultrasonic sensor 2 and the holder 7 are adhesively bonded, for example, to the rear side 6 of the panel part 5. The panel part 5, which is configured, for example, as a thin-walled bumper, has only a thickness d1 which does not block the transmission and/or reception of the ultrasonic signals.

Limitations therefore arise with respect to the fitting site of the ultrasonic sensor 2 on the motor vehicle since the ultrasonic sensor 2 can be attached merely to rear sides 6 of panel parts 5 that have a maximum thickness of, for example, d1.

FIG. 2 shows an embodiment of an ultrasonic sensor arrangement 8 according to the invention in a side view. The ultrasonic sensor arrangement 8 has the ultrasonic sensor 2. In addition, the ultrasonic sensor arrangement 8 comprises the panel part 9 which has a thickness d2 and a material composition or a material M. The panel part 9 blocks the transmission and/or reception of the ultrasonic waves because of the material M and/or the material thickness d2. The panel part 9 here prevents penetration of the ultrasonic waves beyond the material thickness d2 either entirely or weakens the ultrasonic waves during the penetration in such a manner that a signal strength of the ultrasonic waves does not permit any monitoring as intended of the exterior region A. The panel part 9 is therefore actually unsuitable for use in combination with an ultrasonic sensor 2.

The panel part 9 can have, for example, real glass, a plastic, wood or a metal, which in each case has a material-specific minimum thickness d2 for blocking the ultrasonic signals, as the material M. The panel part 9 is therefore configured, for example, as a window of the motor vehicle, a spoiler, a decorative strip or a vehicle pillar.

In order to permit transmission and/or reception of ultrasonic signals even in combination with such an unsuitable panel part 9, the panel part 9 has a continuous recess 10. The continuous recess 10 can be, for example, a bore in the panel part 9. The ultrasonic sensor 2 is arranged here within the recess 10.

In addition, the ultrasonic sensor arrangement 8 has a covering 11 which is mechanically connected, for example adhesively bonded, in particular to the front side 3 of the ultrasonic sensor 2. The ultrasonic sensor 2 can therefore be arranged in the recess 10 and/or removed from the recess 10 together with the covering 11. The covering 11 is configured here in such a manner that transmission and/or reception of ultrasonic signals is possible through the covering and, in the process, the ultrasonic signal is not impaired. The covering 11 can be configured, for example, as a metal lamina of any shape with a thickness of, for example, 1 millimetre. In particular, the covering 11 has a larger surface than the front side 3 of the ultrasonic sensor 2, and therefore the covering 11 projects beyond the lateral edge of the front side 3.

An upper side O1 of the panel part 9 preferably ends flush with an upper side O2 of the covering, and therefore a transition between the upper side O1 of the panel part 9 and the upper side O2 of the covering 11 is not perceivable visually. Furthermore, the upper sides O1 and O2 can be coated with a coat of paint (not shown here). In the case of a panel part 9 manufactured from real gas, it is possible, for example, for a region around the recess 10 in the upper side O1 to be tinted and for the upper side O2 of the covering 11 to be painted in a colour of the tinting. The effect can therefore be achieved that the ultrasonic sensor 2 can also be integrated virtually invisibly into a window of the motor vehicle.

In order to hold the ultrasonic sensor 2, two step-shaped holding elements 13, on which an edge region B of a rear side R of the covering 11 rests, can be provided here on an inner wall 12 of the panel part 9. A gap (not shown here) between an edge of the panel part 9 and the covering 11 can be filled with a sealing material, and therefore, for example, no moisture and no dirt can pass from the exterior region A into the interior I of the motor vehicle.

FIGS. 3a, 3b and 3c show, by way for example, production steps of the ultrasonic sensor arrangement 8. FIG. 3a shows the ultrasonic sensor 2 with the holding device 7, wherein the covering 11 is mechanically coupled to the front side 3 and completely covers the front side 3 here. The covering 11 can be, for example, adhesively bonded to the front side 3 and to the holder 7. The covering 11 has in particular a thickness d3 which does not impair or does not block the transmission of the ultrasonic signals. The covering 11 here can have any shaped surface and can therefore be particularly readily adapted to the subsequent fitting site.

FIG. 3b shows the panel part 9 as a blank. The panel part 9 can be, for example, a soft plastic, real glass, a metal or wood which has material thickness d2. Transmission of ultrasonic signals via the thickness d2 of the panel part 9 is blocked by the material composition itself and/or by the thickness d2 of the material. The transmission and/or reception is blocked here to the extent that the transmission and/or reception of the signal is either completely prevented or is impaired to the extent that the transmitted signal does not have any useable information content for a driver assistance system.

FIG. 3c shows the panel part 9 with the recess 10. The recess 10 can be, for example, drilled into the panel part 9 and is therefore continuous. Step-shaped holding elements 13 for the subsequent holding of the ultrasonic sensor 2 by the edge regions B of the rear side R of the covering 11 resting thereon are provided in the recess 10. The ultrasonic sensor arrangement 8 according to FIG. 2 is produced by arranging the ultrasonic sensor 2, which is shown in FIG. 3a and is connected to the covering 11, in the recess 10 of the panel part 9 shown in FIG. 3c.

FIG. 4 shows an embodiment of a motor vehicle 14 according to the invention which has the panel part 9 with the ultrasonic sensor 2. The ultrasonic sensor 2 can be installed, for example, in a side window 15 as the panel part 9, in a rear window 16 as the panel part 9, in a rear spoiler 17 as the panel part 9, in a roof spoiler 18 as the panel part 9 or in a vehicle pillar 19 as the panel part 9. However, provision may also be made for the ultrasonic sensor 2 to be installed in an interior of the motor vehicle 14 and therefore to be used for monitoring the interior of the motor vehicle 14, for example for detecting people in the interior of the motor vehicle 14.

The invention claimed is:

1. An ultrasonic sensor arrangement for a motor vehicle, with a panel part of the motor vehicle and an ultrasonic sensor which has a front side for transmitting and/or receiving ultrasonic signals via the front side,
   the ultrasonic sensor being arranged within a continuous recess in the panel part and the recess is covered by a covering which does not impair the transmission and/or reception of the ultrasonic signals,
   wherein the panel part has a material and/or a material thickness, by means of which the transmission and/or the reception of the ultrasonic signals is blocked at least in a region of the panel part surrounding the recess,
   wherein the material comprises one selected from a group consisting of real glass, wood, and metallic material, and
   wherein an inner wall of the continuous recess has at least one step-shaped holding element for holding the covering, wherein, in order to cover the continuous recess, a side edge region of a lower side of the covering rests on the at least one step-shaped holding element, and an upper side of the covering ends flush with an upper side of the panel part.

2. The ultrasonic sensor arrangement according to claim 1, wherein the panel part has a plastic as the material.

3. The ultrasonic sensor arrangement according to claim 1, wherein the panel part has a material thickness of at least 4 millimetres.

4. The ultrasonic sensor arrangement according to claim 1, wherein the covering is configured as a metallic lamina with a thickness of at most 1 millimetre.

5. The ultrasonic sensor arrangement according to claim 1, wherein a surface of the covering is larger than a surface of the front side of the ultrasonic sensor, wherein the covering is mechanically connected to the front side, and the covering in the connected state completely covers the front side of the ultrasonic sensor.

6. The ultrasonic sensor arrangement according to claim 1, wherein a gap between the covering and an edge of the recess is filled with a sealing material, and therefore an upper side of the covering and an upper side of the panel part form a continuous surface.

7. The ultrasonic sensor arrangement according to claim 1, wherein an overall upper side formed by upper sides of the covering and of the panel part is coated with a coat of paint.

8. The ultrasonic sensor arrangement according to claim 1, wherein the region, which surrounds the recess, of the panel part which is manufactured from real glass is tinted, and the covering is painted in a colour of the tinting.

9. A motor vehicle with an ultrasonic sensor arrangement according to claim 1.

10. A method for installing an ultrasonic sensor in a panel part of a motor vehicle, comprising:
   arranging the ultrasonic sensor within a continuous recess in the panel part, wherein the ultrasonic sensor transmits and/or receives ultrasonic signals via a front side;
   covering the recess by a covering which does not impair the transmission and/or reception of the ultrasonic signals;
   providing a material and/or a material thickness for the panel part such that the transmission and/or reception of the ultrasonic signals is blocked at least in a region of the panel part surrounding the recess,
   wherein the material comprises one selected from a group consisting of real glass, wood, and metallic material; and
   holding the covering with at least one step-shaped holding element of an inner wall of the continuous recess, wherein, in order to cover the continuous recess, a side edge region of a lower side of the covering rests on the at least one step-shaped holding element, and an upper side of the covering ends flush with an upper side of the panel part.

* * * * *